(12) United States Patent
Hardman

(10) Patent No.: US 7,970,044 B2
(45) Date of Patent: Jun. 28, 2011

(54) SOFT CHIP MODEM

(76) Inventor: Clayton M. Hardman, Orangeville, CA (US)

(*) Notice: Subject to any disclaimer, the term of this patent is extended or adjusted under 35 U.S.C. 154(b) by 708 days.

(21) Appl. No.: 10/647,924

(22) Filed: Aug. 25, 2003

(65) Prior Publication Data
US 2004/0109545 A1  Jun. 10, 2004

Related U.S. Application Data

(60) Provisional application No. 60/405,508, filed on Aug. 26, 2002.

(51) Int. Cl.
*H04B 1/38* (2006.01)
(52) U.S. Cl. .......................... 375/219; 375/222
(58) Field of Classification Search .................. 375/222, 375/219, 220, 221
See application file for complete search history.

(56) References Cited

U.S. PATENT DOCUMENTS

| | | | | |
|---|---|---|---|---|
| 5,710,843 | A * | 1/1998 | Tsukamoto et al. | 382/305 |
| 6,229,846 | B1 * | 5/2001 | Lassig et al. | 375/222 |
| 6,249,531 | B1 * | 6/2001 | Jacobi et al. | 370/477 |
| 6,292,484 | B1 * | 9/2001 | Oliver | 370/389 |
| 6,301,339 | B1 * | 10/2001 | Staples et al. | 379/93.01 |
| 6,868,081 | B1 * | 3/2005 | Akram et al. | 370/356 |
| 2001/0002902 | A1 * | 6/2001 | Hamdi | 370/266 |
| 2001/0054131 | A1 * | 12/2001 | Alvarez et al. | 711/105 |
| 2002/0100029 | A1 * | 7/2002 | Bowen | 717/140 |
| 2003/0152105 | A1 * | 8/2003 | Arimilli | 370/468 |
| 2003/0161295 | A1 * | 8/2003 | Shah et al. | 370/352 |
| 2003/0165122 | A1 * | 9/2003 | Westphal | 370/329 |
| 2008/0175233 | A1 * | 7/2008 | Chung et al. | 370/356 |

* cited by examiner

*Primary Examiner* — Emmanuel Bayard
(74) *Attorney, Agent, or Firm* — Philip M. Weiss; Weiss & Weiss

(57) ABSTRACT

A system and method that provides a user multiple, simultaneous uses of a single analog line. The system comprises a modem, wherein the modem compresses a signal traveling through the analog line. The modem provides simultaneous transmission of two or more speech or data calls.

9 Claims, 2 Drawing Sheets

Scenario #1 – one to one SCM

No additional environment required on the central Switch side. Each SCM may have more than one voice attached to it.

Scenario #2 – one SCM to two different destinations

Additional multiplexing environment required on the central Switch side.

Scenario #1 – one to one SCM

No additional environment required on the central Switch side. Each SCM may have more than one voice attached to it.

Scenario #2 – one SCM to two different destinations

Additional multiplexing environment required on the central Switch side.

SOFT CHIP MODEM

RELATED APPLICATIONS

The present invention is a continuation of provisional patent application No. 60/405,508 filed Aug. 26, 2002.

BACKGROUND OF THE INVENTION

Handel-C was developed at Oxford University's Computing Laboratory and will allow electronic devices to be instantly programmed and indefinitely reprogrammed to perform any number of different functions. Its novel "software compiler" system operates in conjunction with a new generation of FPGA, or Field Programmable Gate Array<chips. A microprocessor has a fixed number of functions that cannot be altered after manufacture. FPGA chips posses an almost limitless range of functions and flexibility.

SUMMARY OF THE INVENTION

The SoftChip modem incorporates Handel-C, an ultra-fast programming language, designed around a simple timing model that makes it very accessible to system architects and software engineers. The SoftChip modem functions as a line splitter, can be reprogrammed as needed verses re-engineered, provides new functionality via software downloads, on analog lines as well as cable, satellite and fiber lines. This is not a temporary interruption, to provide service, but simultaneous use of the line.

DETAILED DESCRIPTION OF INVENTION

The attached flow chart and block design describes the Soft Chip modem aimed to provide the simultaneous transmission of two, or more, speech or data calls and to provide flexible deployment of value added services implemented on plain old telephone service (POTS) lines.

To provide simultaneous transmission of two or more speech or data calls conventional analog voice traffic is compressed to occupy less bandwidth, thus freeing up the remaining bandwidth for additional voice or data traffic. A speech compression algorithm that provides sufficient quality of sound and requires only between 5.6 and 6.4 kbps of bandwidth is embedded within the SoftChip system.

To provide flexible deployment of value added services implemented on phone connections, the SoftChip modem incorporates Field Programmable Gate Array (FPGA) chips, hosting downloadable logic.

The SoftChip system is connected to a conventional copper line by an internal COTS modem. This would support two speech calls plus protocol overhead and be implemented as a plug-in board with a common interface that can be used for more powerful modems including digital ISDN and ADSL.

In one embodiment, a pair of SoftChip modems is used, one at each end of the analog link; the first compresses and multiplexes the data at the source end of the line, the second de-multiplexes and expands the data at the exchange end of the copper link.

Figure 1:
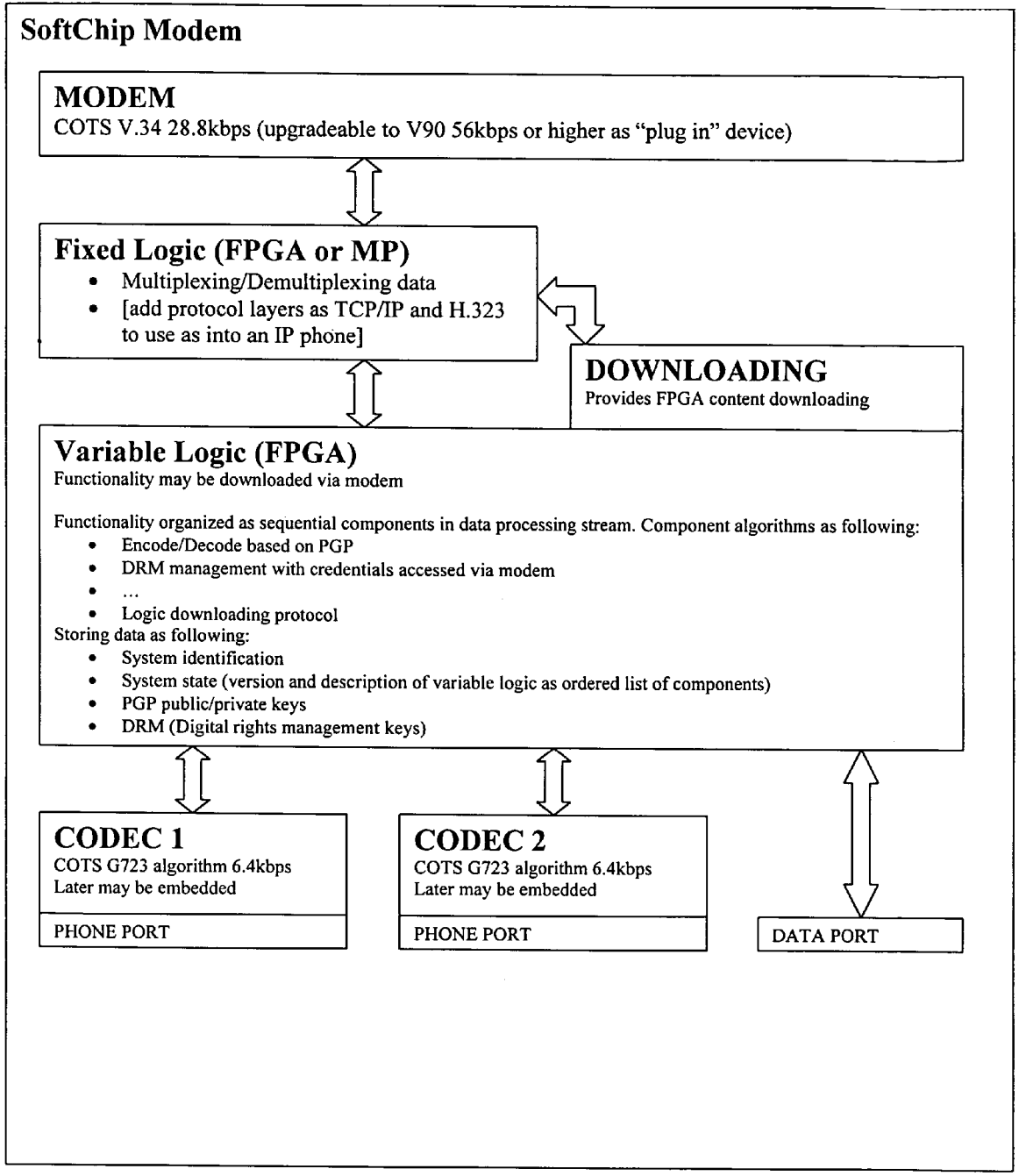
FIG. 1; a flow chart illustrating and embodiment of the present invention.

FIG. 1 shows the SoftChip modem of the present invention. FIG. 1 shows a modem COTS V. 3428.8 KBPS (upgradeable to V 90 56 KBPS or higher as a plug in device.

The modem goes to a fixed logic system which multiplexes or demultiplexes data. It can add protocol layers as TCP/IP and H.323 to use as into an IP phone. The fixed logic system then can flow into a variable logic system. The functionality can be downloaded via modem. The functionality is organized as sequential components in a data processing stream. Component algorithms are as follows: encode/decode based PGP; DRM management with credentials accessed via modem and logic downloading protocol. Storing data is as follows: system identification; system state (version and description of variable logic as ordered list of components); PGP public/private keys and digital rights management keys. The system provides fixed logic content downloading. This information can be transferred to phone ports or data ports.

Figure 2:
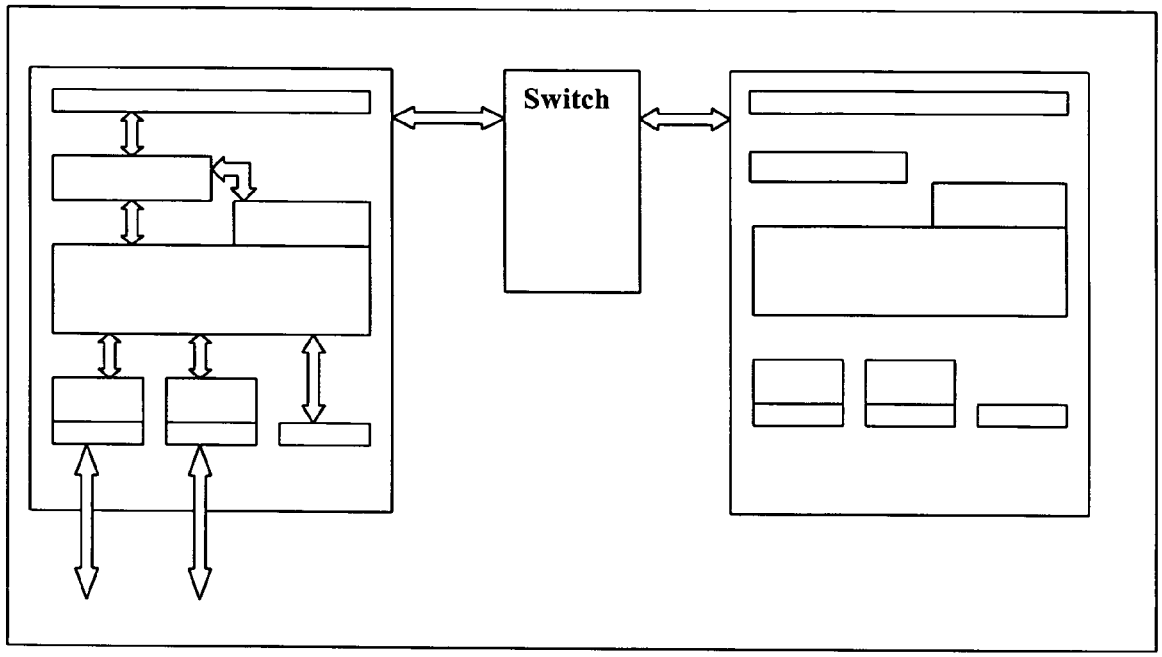
FIG. 2; a block diagram illustrating the present invention.
Figure 2:
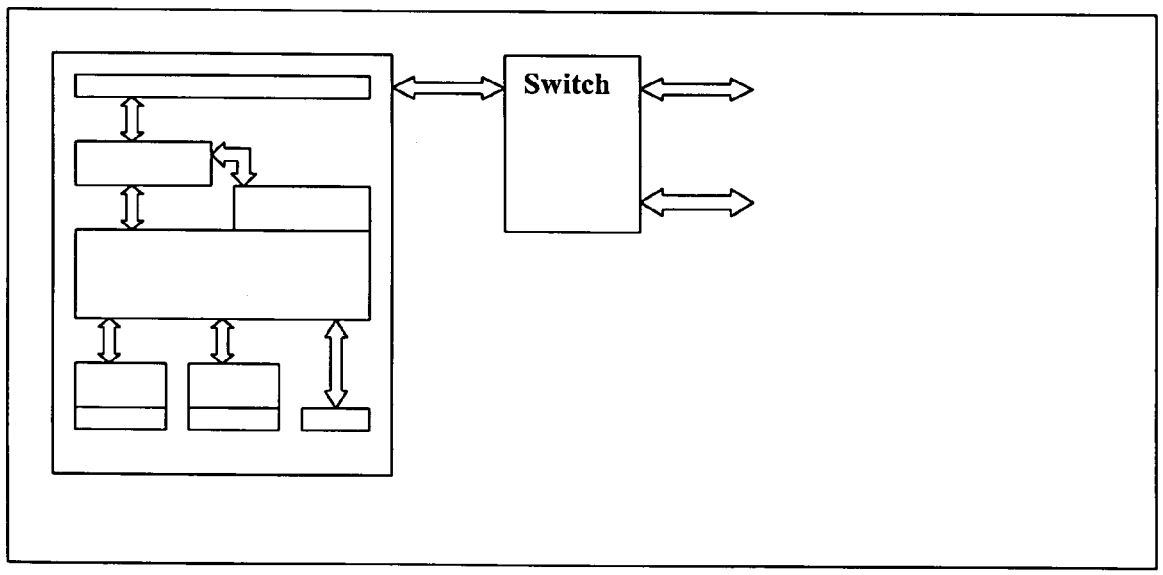

FIG. 2 shows two scenarios of the present invention. In scenario modem one SoftChip modem is providing information to a second SoftChip modem. No additional information is required on the central switch side. Each SoftChip modem may have more than one voice/data source attached to it.

Scenario two comprises one SoftChip modem providing information to two different destinations. In this scenario additional multiplexing environment is required on the central switch side.

The invention claimed is:

1. A system that provides a user of a single analog line multiple uses of said line comprising;
   a modem connected to a fixed logic system which multiplexes or demultiplexes data;
   said modem compressing a signal traveling through said analog line;
   said modem providing simultaneous transmission of two, or more, speech or data calls;
   said simultaneous transmission by compressing conventional analog voice traffic to occupy less band width;
   said modem is programmable.

2. The system of claim 1 wherein said modem incorporates Handel-C.

3. The system of claim 1 wherein said system is reprogrammed as needed.

4. The system of claim 1 wherein said modem is downloaded on analog lines, cable, satellite and fiber lines.

5. The system of claim 1 further comprising a speech compression algorithm requiring between about 5.6 to 6.4 kbps of bandwidth.

6. The system of claim 1 wherein said modem further comprises field programmable gate array chips.

7. The system of claim 1 wherein said system is connected to a copper line by a COTS modem.

8. The system of claim 1 wherein said system comprises two modems, one at each end of an analog line;
   a first modem compresses and multiplexes data at a source end of said line;
   and a second modem demultiplexes and expands data at an exchange end of a copper line.

9. A system that provides a user of a single analog line multiple uses of said line comprising;
   a modem connected to a fixed logic system which multiplexes or demultiplexes data;
   said modem compressing a signal traveling through said analog line;
   said modem providing simultaneous transmission of two, or more, speech or data calls;
   said simultaneous transmission by compressing conventional analog voice traffic to occupy less band width;

said modem is programmable;
said modem is downloaded on analog lines, cable, satellite and fiber lines;
a speech compression algorithm requiring between about 5.6 to 6.4 kbps of bandwidth;

said modem comprising field programmable gate array chips.

* * * * *